(12) United States Patent
Shen et al.

(10) Patent No.: US 10,200,975 B2
(45) Date of Patent: Feb. 5, 2019

(54) RADIO BASE STATION, RADIO COMMUNICATION SYSTEM AND RADIO COMMUNICATION METHOD

(71) Applicant: NTT DOCOMO, INC., Tokyo (JP)

(72) Inventors: Jiyun Shen, Tokyo (JP); Satoshi Suyama, Tokyo (JP); Yukihiko Okumura, Tokyo (JP); Tetsuro Imai, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 259 days.

(21) Appl. No.: 14/916,670

(22) PCT Filed: Sep. 2, 2014

(86) PCT No.: PCT/JP2014/073069
§ 371 (c)(1),
(2) Date: Mar. 4, 2016

(87) PCT Pub. No.: WO2015/033929
PCT Pub. Date: Mar. 12, 2015

(65) Prior Publication Data
US 2016/0205667 A1    Jul. 14, 2016

(30) Foreign Application Priority Data

Sep. 6, 2013 (JP) .................................. 2013-185081

(51) Int. Cl.
*H04W 72/04* (2009.01)
*H04B 17/309* (2015.01)
(Continued)

(52) U.S. Cl.
CPC .......... *H04W 72/04* (2013.01); *H04B 17/309* (2015.01); *H04B 17/391* (2015.01); *H04W 24/02* (2013.01); *H04W 88/08* (2013.01)

(58) Field of Classification Search
CPC ...... H04B 17/30; H04B 17/391; H04B 17/23; H04B 17/24; H04B 1/0475; H04W 24/02;
(Continued)

(56) References Cited

U.S. PATENT DOCUMENTS

| 9,210,586 B2 | 12/2015 | Catovic et al. |
| 2008/0158044 A1* | 7/2008 | Talbot ............... E02F 3/842 |
| | | 342/54 |

(Continued)

FOREIGN PATENT DOCUMENTS

| JP | 2011-024154 A | 2/2011 |
| JP | 2012-526496 A | 10/2012 |

OTHER PUBLICATIONS

International Search Report issued in PCT/JP2014/073069 dated Dec. 2, 2014 (2 pages).

(Continued)

*Primary Examiner* — Jamal Javaid
*Assistant Examiner* — Rosene Clark
(74) *Attorney, Agent, or Firm* — Osha Liang LLP

(57) ABSTRACT

The present invention is designed so that a radio base station controls base station parameters dynamically, in accordance with changes in the surrounding propagation environment. The radio base station according to the present invention has a surrounding environment information acquiring section that acquires surrounding environment information, which is information about the environment in a service area, a propagation environment information extraction section that extracts propagation environment information, which is information about electric wave propagation, based on the surrounding environment information, and a base station parameter generating section that generates base station parameters, which are information about the control of (Continued)

electric waves to transmit and receive, based on the propagation environment information.

12 Claims, 14 Drawing Sheets

(51) Int. Cl.
    *H04W 24/02*     (2009.01)
    *H04B 17/391*     (2015.01)
    *H04W 88/08*     (2009.01)

(58) Field of Classification Search
    CPC ..... H04W 72/04; H04W 88/08; H04W 16/18; H04W 16/28; H04W 72/085; H01Q 3/005; H01Q 19/10; H01Q 19/104
    See application file for complete search history.

(56) References Cited

U.S. PATENT DOCUMENTS

| | | | |
|---|---|---|---|
| 2010/0190456 A1* | 7/2010 | Asplund | H04B 17/103 455/106 |
| 2010/0311415 A1* | 12/2010 | Hamabe | H04W 24/02 455/425 |
| 2011/0019576 A1* | 1/2011 | Kobayashi | H04W 16/18 370/252 |
| 2011/0244786 A1* | 10/2011 | Fujii | H01Q 19/10 455/7 |
| 2012/0044104 A1* | 2/2012 | Schloetzer | G01S 5/0263 342/128 |
| 2012/0314807 A1* | 12/2012 | Koizumi | H04B 1/0475 375/297 |
| 2014/0286298 A1* | 9/2014 | Yoshimoto | H04B 7/024 370/329 |
| 2015/0215793 A1* | 7/2015 | Siomina | G01S 5/0205 455/456.1 |

OTHER PUBLICATIONS

Written Opinion of the International Searching Authority issued in PCT/JP2014/073069 dated Dec. 2, 2014 (4 pages).
3GPP TR 36.814 V9.0.0; "3rd Generation Partnership Project; Technical Specification Group Radio Access Network; Evolved Universal Terrestrial Radio Access (E-UTRA); Further advancements for E-UTRA physical layer aspects (Release 9)"; Mar. 2010 (104 pages).
Office Action issued in corresponding Japanese Patent Application No. 2013-185081, dated Jul. 25, 2017 (9 pages).

* cited by examiner

RADIO BASE STATION, RADIO COMMUNICATION SYSTEM AND RADIO COMMUNICATION METHOD

TECHNICAL FIELD

The present invention relates to a radio base station, a radio communication system and a radio communication method.

In LTE (Long Term Evolution) and successor systems of LTE (referred to as, for example, "LTE-advanced," "FRA (Future Radio Access)," "4G," etc.), a radio communication system (referred to as, for example, a heterogeneous network) to place small cells (including pico cells, femto cells and so on) having a relatively small coverage of a radius of approximately several meters to several tens of meters, in a macro cell having a relatively large coverage of a radius of approximately several hundred meters to several kilometers, is under study (see, for example, non-patent literature 1).

For this radio communication system, a scenario to use the same frequency band in both the macro cell and the small cells (also referred to as, for example, "co-channel") and a scenario to use different frequency bands between the macro cell and the small cells (also referred to as, for example, "separate frequencies") are under study. To be more specific, the latter scenario is under study to use a relatively low frequency band (for example, 2 GHz) (hereinafter referred to as the "low frequency band") in the macro cell, and use a relatively high frequency band (for example, 3.5 GHz or 10 GHz) (hereinafter referred to as the "high frequency band") in the small cells.

Non-Patent Literature 1: 3GPP TR 36.814 "E-UTRA Further Advancements for E-UTRA Physical Layer Aspects"

SUMMARY OF INVENTION

Technical Problem

Now, in conventional radio communication systems, when a radio base station is installed, the base station parameters (the transmission power, the transmission direction, the tilt angle, the transmitting/receiving weights and so on) are configured from the data that is given by measuring or predicting the surrounding propagation environment (the electric wave propagation characteristics near the base station). However, with this parameter configuration method, there is a threat that the parameters that are configured upon installation become inadequate when the reliability of measurements is poor or when a change occurs in the surrounding propagation environment after the installation.

In particular, a structure is under study in which many small base stations to form small cells are placed within one macro cell, and therefore there are many variations of environment in which small base stations may be installed, compared to those of macro base stations to form macro cells. Consequently, it is difficult to determine how to conduct propagation measurements or propagation prediction for configuring base station parameters in every different environment. Also, since small base stations have comparatively narrow service areas (coverage areas), the movement of users and objects result in significant changes in the propagation environment. Consequently, in small base stations, it becomes very difficult to configure adequate base station parameters by conducting propagation measurements or propagation prediction in advance.

The present invention has been made in view of the above, and it is therefore an object of the present invention to provide a radio base station, a radio communication system and a radio communication method, whereby base station parameters can be controlled adequately in accordance with changes in the surrounding propagation environment.

Solution to Problem

The radio base station according to present invention provides a radio base station which has a surrounding environment information acquiring section that acquires surrounding environment information, which is information about environment in a service area, a propagation environment information extraction section that extracts propagation environment information, which is information about electric wave propagation, based on the surrounding environment information, and a base station parameter generating section that generates base station parameters, which are information about control of electric waves to transmit and receive, based on the propagation environment information.

Advantageous Effects of Invention

According to the present invention, a radio base station can control base station parameters adequately in accordance with changes in the surrounding propagation environment.

DESCRIPTION OF EMBODIMENTS

Figure 1:
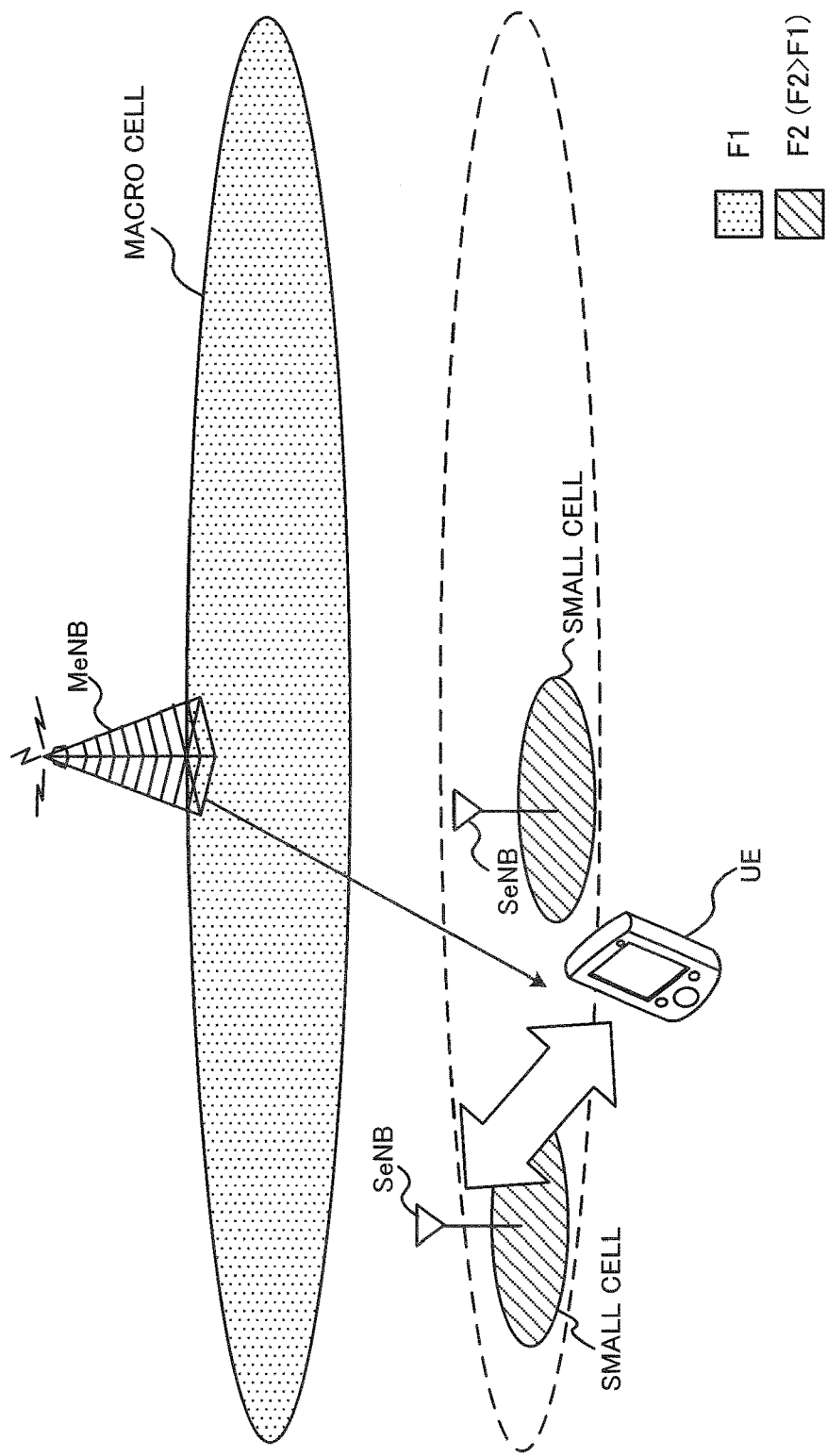
FIG. 1 is a conceptual diagram of a HetNet.

FIG. 1 is an example of a conceptual diagram of a network structure in which radio base stations (for example, small base stations) according to the present embodiment are employed. FIG. 1 shows a network structure in which small base stations form small cells that overlay with the cell area of a macro cell. To be more specific, the network structure shown in FIG. 1 includes a radio base station (hereinafter referred to as the "macro base station" or "MeNB" (Macro eNodeB)) that forms a macro cell, radio base stations (hereinafter referred to as the "small base stations" or "SeNBs" (small eNodeBs)) that each form a small cell, and a user terminal (UE: User Equipment) that communicates with the macro base station and at least one of the small base stations.

In relationship the network structure shown in FIG. 1, a study is in progress to use a carrier F1 of a relatively low frequency band (hereinafter referred to as the "low frequency band") in the macro cell, and use a carrier F2 of a relatively high frequency band (hereinafter referred to as the "high frequency band") in the small cells. In this case, a study is also in progress to secure coverage and provide mobility support in the macro cell that uses the carrier F1 of the low frequency band, and achieve increased capacity and offloading with the small cells that use the carrier F2 of the high frequency band (also referred to as "macro-assisted," "C/U-plane split," etc.). Note that the network structure where radio base stations according to the present embodiment may be employed is by no means limited to the structure shown in FIG. 1. The present embodiment is equally applicable to cells that do not overlap other cells.

Figure 2:
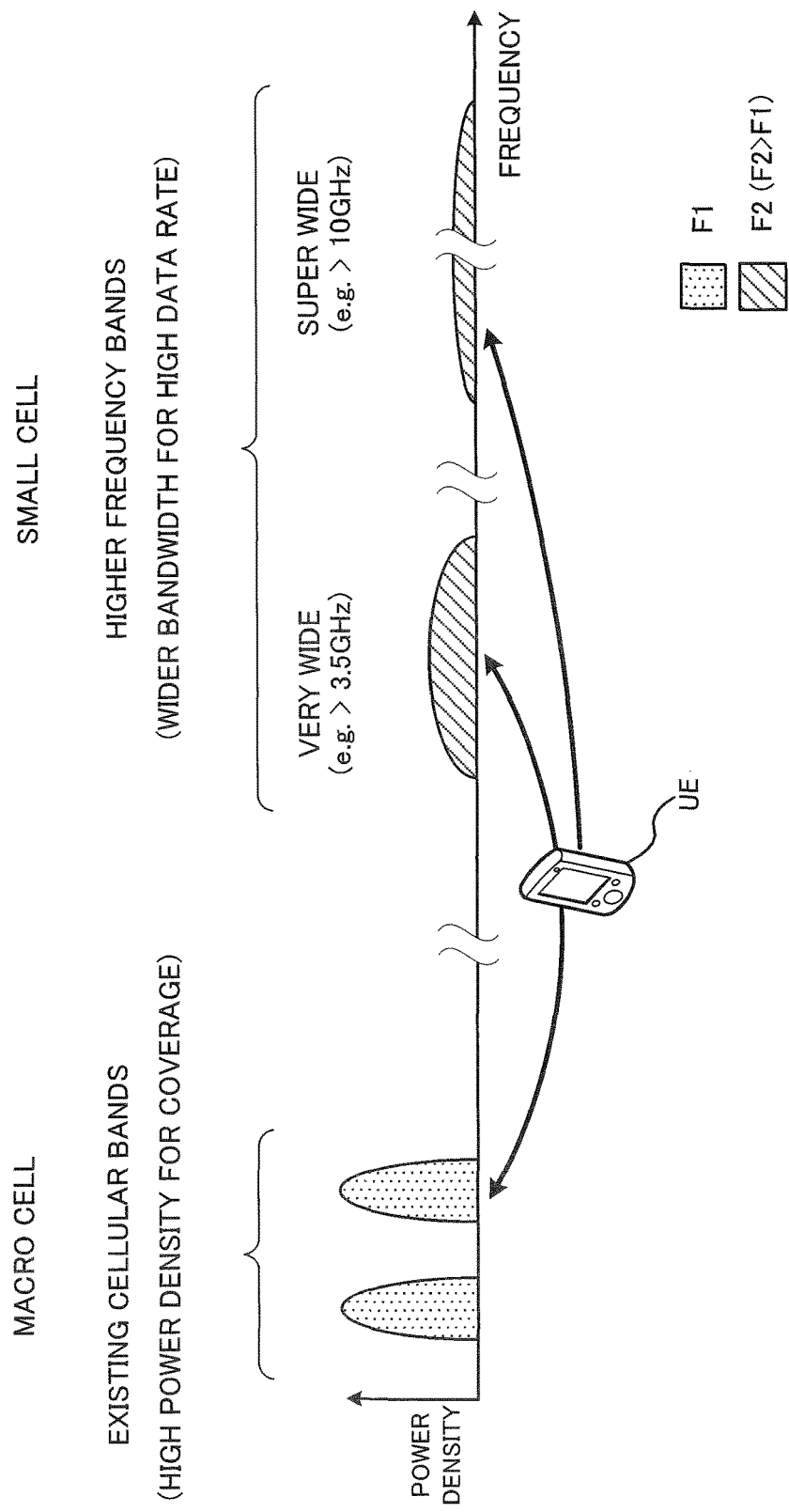
FIG. 2 is a diagram to explain examples of carriers for use in a macro cell and a small cell.

FIG. 2 is a diagram to show examples of the carriers F1 and F2. As shown in FIG. 2, it is possible to use, for the carrier F1 of the low frequency band, a carrier of an existing frequency band such as, for example, 800 MHz and 2 GHz (existing cellular bands). On the other hand, for the carrier F2 of the high frequency band, it is possible to use a carrier of a higher frequency band than the existing frequency bands, such as, for example, 3.5 GHz and 10 GHz.

As shown in FIG. 2, the transmission power density of the carrier F1 is higher than the transmission power density of the carrier F2, so that the macro cell has a greater coverage than the small cells. Meanwhile, the transmission bandwidth (bandwidth) of the carrier F2 can be secured wider than the transmission bandwidth of the carrier F1, so that the small cells achieve higher transmission speeds (capacity) than the macro cell.

Now, path loss increases in proportion to frequency f. Consequently, in small cells to use the carrier F2 of the high frequency band, a study is in progress to compensate for path loss by applying beamforming by way of massive MIMO (Massive Multiple Input Multiple Output, also referred to as "3D/massive MIMO").

The massive-MIMO transmission scheme achieves improved data rates (spectral efficiency) by transmitting data using a large number (for example, 100 or more) of antenna elements. Since data is transmitted by using a large number of antenna elements, compared to when a small number of antenna elements are used, it becomes possible to improve the efficiency of transmission by virtue of multiplexing, and enable faster radio communication than heretofore. Also, reliable beamforming is made possible by combining a large number of antenna elements.

Figure 3:
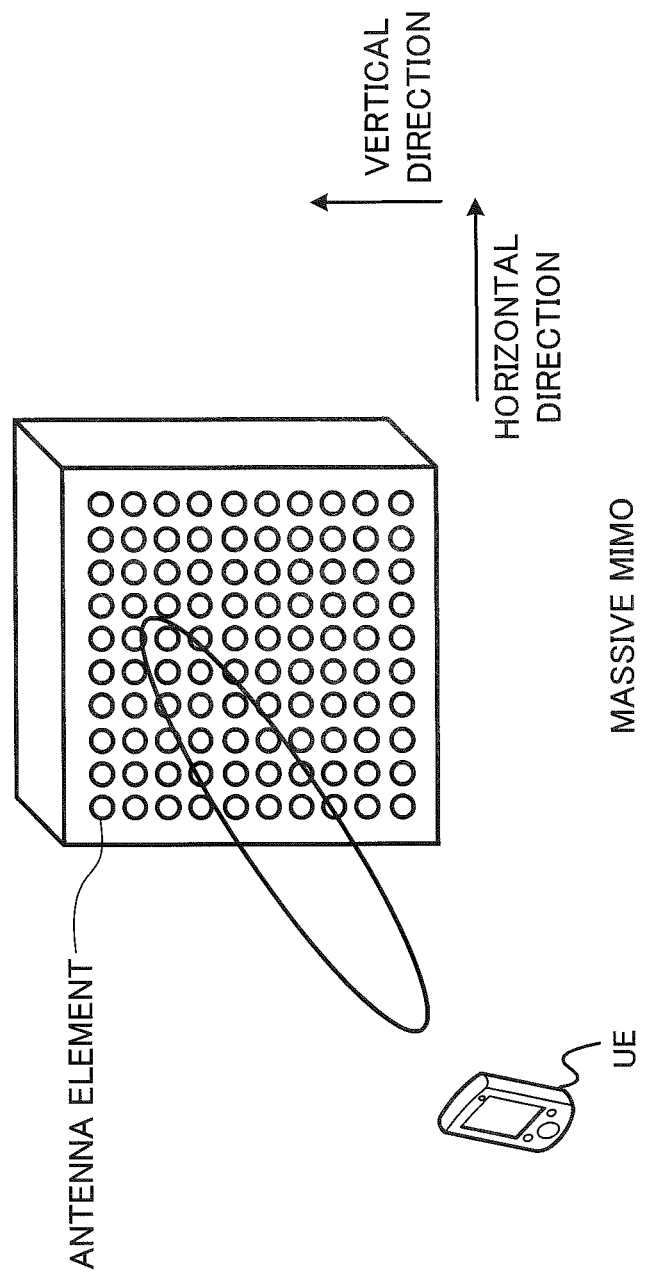
FIG. 3 is a diagram to explain massive MIMO.

FIG. 3 is a diagram to explain massive MIMO. When massive MIMO is used, a plurality of antenna elements are arranged on a two-dimensional plane. For example, as shown in FIG. 3, a plurality of antenna elements may be arranged evenly in the horizontal direction and in the vertical direction on a two-dimensional plane. In this case, in theory, the number of antenna elements that can be arranged on the two-dimensional plane increases in proportion to the square of frequency f. Note that, although not illustrated, a plurality of antenna elements may be arranged three-dimensionally as well.

Now, in conventional radio communication systems, when a radio base station is installed, the base station parameters (the transmission power, the transmission direction, the tilt angle, the transmitting/receiving weights and so on) need to be configured from the data that is given by measuring or predicting the surrounding propagation environment (the electric wave propagation characteristics near the base station). However, given that a structure is under study in which many small base stations are placed within one macro cell, there are many variations of environment in which small base stations may be installed, compared to those of macro base stations. Consequently, it is difficult to determine how to conduct propagation measurements or propagation prediction for configuring base station parameters in every different environment. Also, since small base stations have comparatively narrow service areas (coverage areas), the movement of users and objects result in significant changes in the propagation environment. Consequently, there is a problem that, in small base stations, it becomes very difficult to configure adequate base station parameters by conducting propagation measurements or propagation prediction in advance.

Figure 4:
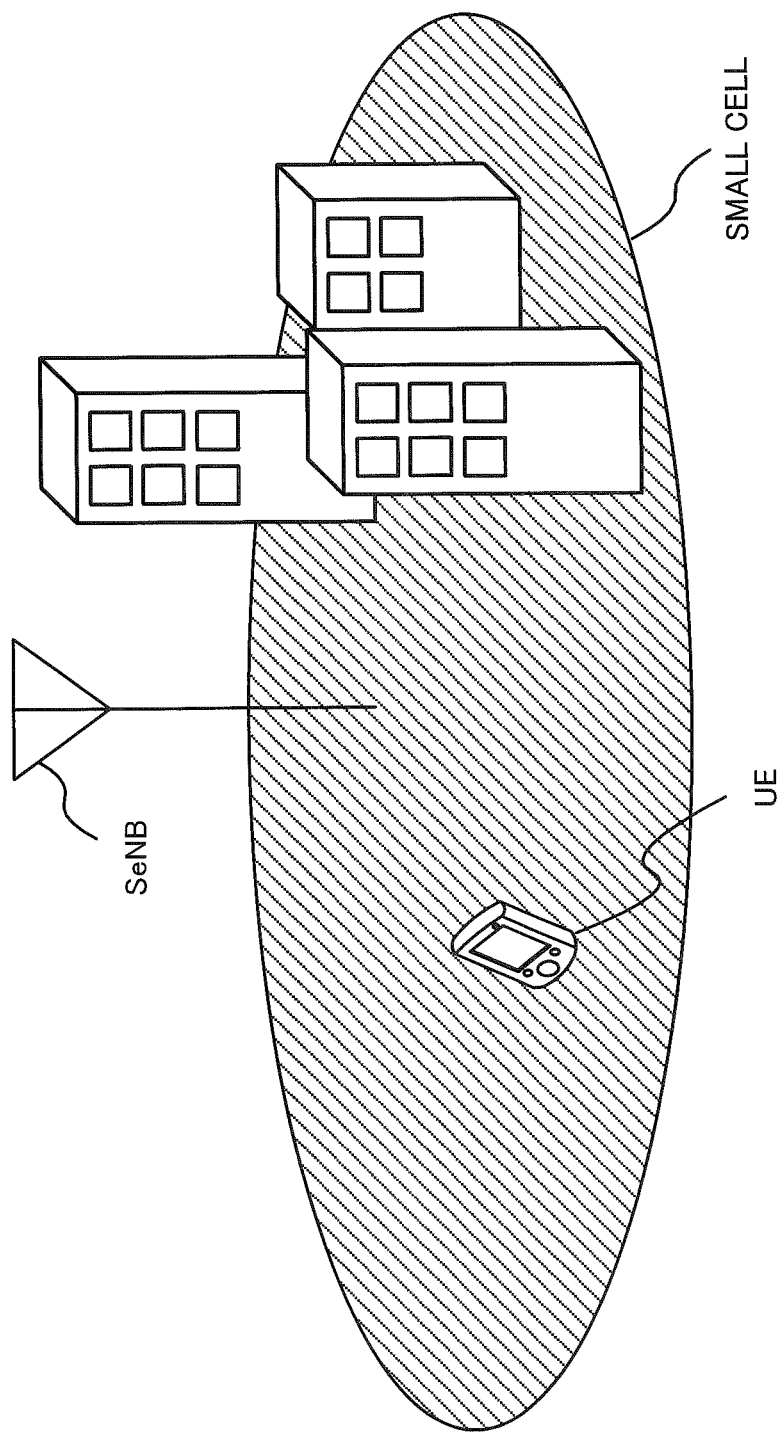
FIG. 4 is a diagram to explain a case where there is no shielding object in a small cell's service area.
Figure 5:
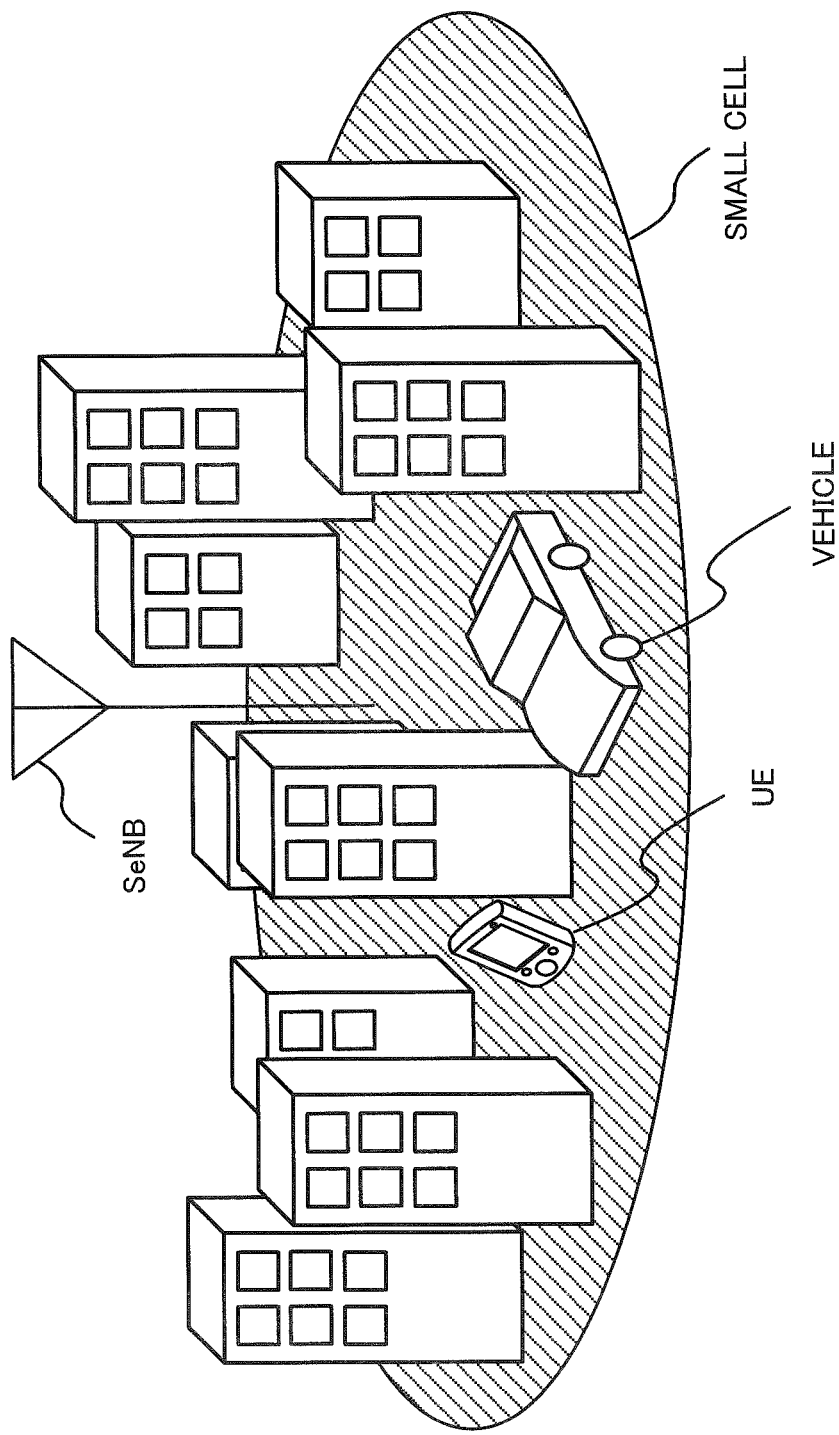
FIG. 5 is a diagram to explain a case where there are many shielding objects in a small cell's service area.

Now, assume a case where, for example, there are not many shielding objects in a small cell's service area when the small base station SeNB is installed (FIG. 4), but where, later, the shielding objects (buildings and so on) increase in number (FIG. 5). The UEs in FIG. 4 and FIG. 5 are present in the same geographic location seen from the small base station SeNB, but their propagation environments vary significantly. Consequently, using the base station parameters that are determined at the time illustrated in FIG. 4 in the environment of FIG. 5 leads to deterioration of communication quality.

Also, when there is a moving object such as a vehicle as shown in FIG. 5, even if the UE does not change its location, significant changes in the propagation environment occur, depending on the location of the vehicle (for example, when the vehicle is present between the UE and the base station). Also, when the UE itself moves fast, such as when the UE is in a vehicle, changes in the propagation environment are significant compared to when the UE does not change its location. Also, since a small base station has a narrow service area, even when user terminals and objects in the small cell move at relatively low speeds of movement such as when people walk, the propagation environment in the small cell is likely to change significantly.

So, the present inventors have worked on a radio base station that can control base station parameters adequately in accordance with changes in the surrounding propagation environment, and arrived at the present invention.

Figure 6:
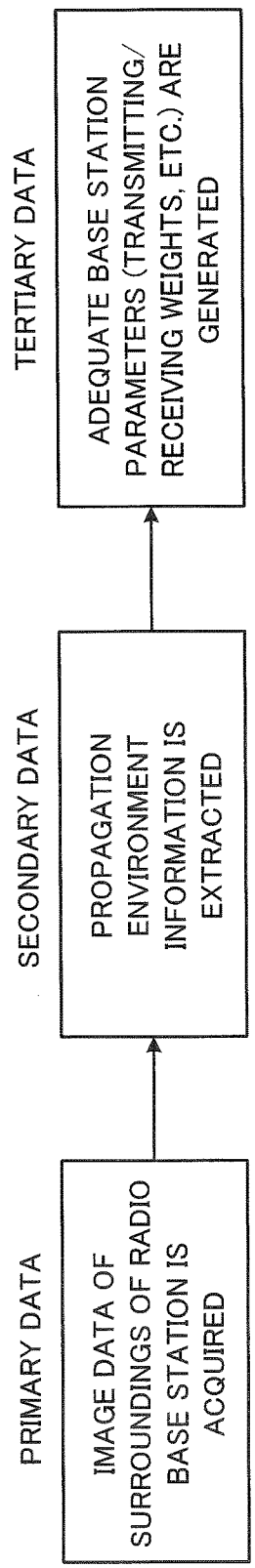
FIG. 6 is a diagram to explain a base station parameter control method in a radio base station according to the present embodiment.

The radio base station according to the present embodiment has a propagation environment information extraction section that extracts propagation environment information, which is information about electric wave propagation, based on the surrounding environment information, and a base station parameter generating section that generates base station parameters, which are information about control of electric waves to transmit and receive, based on the propagation environment information. This radio base station estimates propagation environment information (hereinafter referred to as "secondary data") from surrounding environment information (hereinafter referred to as "primary data"), which is acquired by scanning the surroundings, and controls the base station parameters (hereinafter referred to as "tertiary data") adequately. FIG. 6 is a diagram to show an overview of the base station parameter control method in the radio base station according to the present embodiment. In FIG. 6, the radio base station acquires image data of the surroundings as primary data, acquires propagation environment information as secondary data, and generates adequate base station parameters (transmitting/receiving weights and so on) as tertiary data.

Here, the surrounding environment information refers to information for analyzing the surrounding environment, and includes, for example, image data, data acquired from sensors, and so on. The propagation environment information refers to information, about the propagation of electric waves with respect to objects, buildings and people near the radio base station, and includes, for example, the direction, distance, size, speed of movement, reflection coefficient and so on of these objects with respect to the radio base station. Also, the base station parameters include, for example, the transmission power of signals, the transmission direction, the antenna tilt angle, the transmitting/receiving weights (beamforming weights) and so on.

Figure 7:
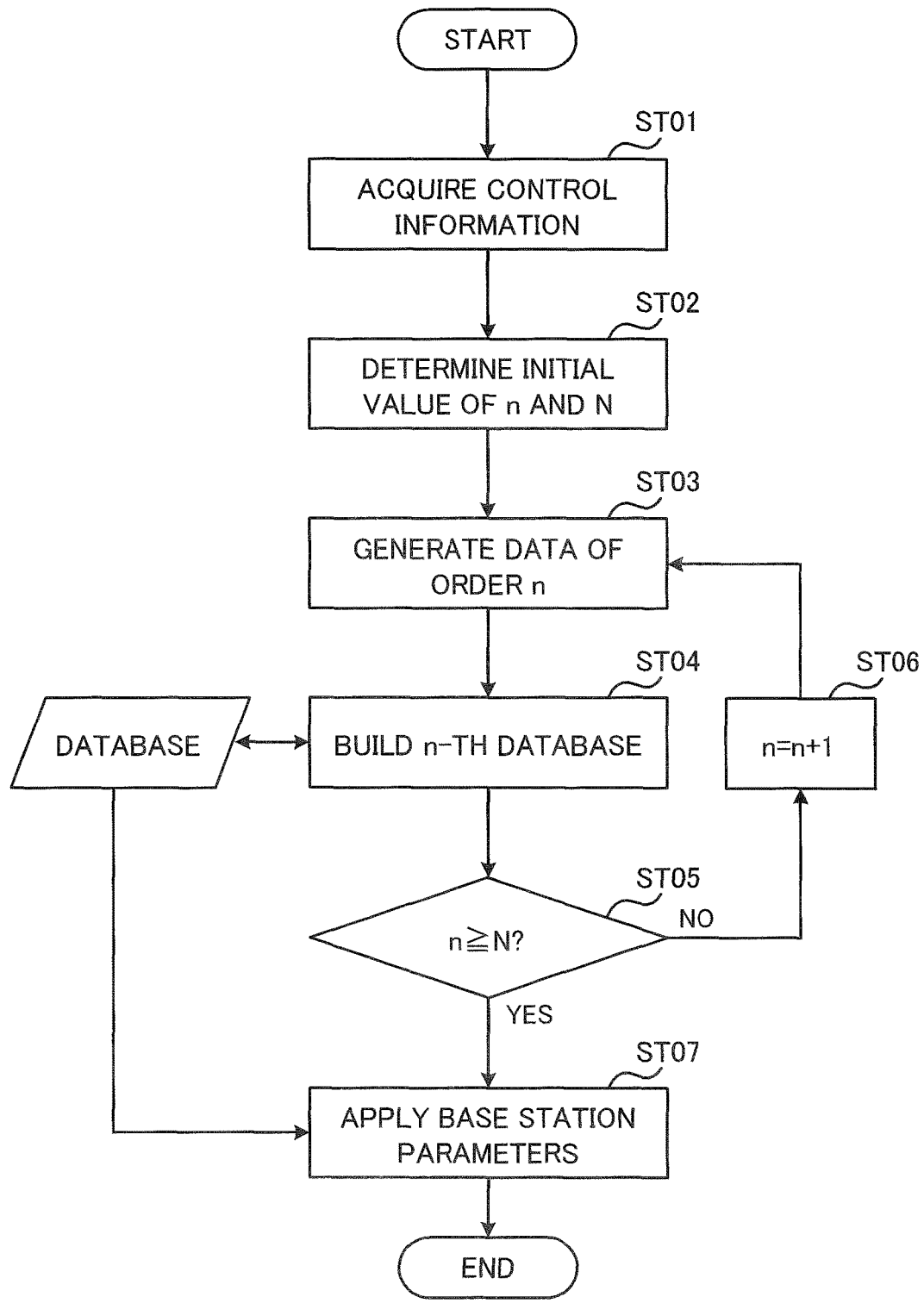
FIG. 7 shows an example of a base station parameter control method for a radio base station according to the present embodiment.

An example of the base station parameter control method in the radio base station according to the present embodiment is shown in FIG. 7. A case will be shown in the following description where the radio base station creates databases for primary to tertiary data (hereinafter referred to as "DBs"), and determines tertiary data from these DBs.

First, the radio base station acquires the algorithm for generating data, the type of DBs and so on, as control information (step ST01). Although the present embodiment presumes that the control information is held in the radio base station in advance, the control information may be provided from outside as well. For example, the control information may be provided from a higher base station (for example, a macro base station). As for the type of DBs, although relational DBs will be used with the present embodiment, the present embodiment may be structured to use other DBs such as hierarchical DBs. Note that the base station parameter control illustrated in FIG. 7 may be configured to be carried out when a control signal is supplied, or may be configured to be executed on a regular basis.

Next, the initial value of n and N are determined (step ST02). Here n is the order of the DB to build next, and n is a natural number equal to or greater than 1. N is the order of the DB to be build last. For example, if n=1 and N=3 hold, the flow executes the process of making primary to tertiary data. Note that n and N may be configured on the basis of control information, information from outside and so on. Also, each database is preferably updated at predetermined time intervals. However, it is equally possible to update each database at different updating time intervals, and by making n=x and N=x (where x is a natural number equal to or greater than 1) as appropriate, it is possible to execute the process of updating the data of the order x alone.

Next, the data of the order n is generated (step ST03). When each data is generated, if necessary, data is acquired from sensors, DBs or from outside. Primary data is generated by acquiring surrounding environment information by using sensors provided in the radio base station and so on. For example, data that is acquired from sensors (sensor data) and information from outside are acquired on the basis of control information. The sensor data may include image data that is taken by cameras, and the information from outside may include image data that is reported from other radio base stations. Also, secondary data is generated using the primary data. For example, an object is extracted from image data by way of image recognition, and also the distance to the object is estimated. Also, tertiary data is generated using the secondary data. For example, the intensity with which an object that is present at a predetermined distance from the radio base station receives the signals transmitted from the radio base station is simulated by the ray tracing method, and the result is obtained. On the basis of this result, the transmission power and transmitting weight of the signals to transmit to the object are determined. When each data is generated, if necessary, data may be acquired from sensors, DBs or from outside.

Next, an n-th database is built (step ST04). The database is built by storing the data of the order n in a format to suit the n-th database. Note that, instead of adding input data to the database on an as-is basis, it is possible to correct and remove data.

Next, whether or not n is equal to or greater than N is decided (step ST05). When n is less than N (step ST05: NO), n is incremented (one is added to n) (step ST06), and step ST03 is performed again. That is, steps ST03 to ST06 are repeated until n becomes equal to or greater than N.

When n becomes equal to or greater than N (step ST05: YES), the radio base station looks up the database and applies adequate base station parameters (step ST07). For example, on the basis of the tertiary database, base station parameters are applied so that the received quality in each location within the cell becomes high on average.

Note that, in step ST03, if information that is the same or similar to the information that is acquired is already in the database, steps ST03 to ST06 may be skipped with respect to this information. That is, it may be possible to simplify the process pertaining to database building by re-using data. Also, by carrying machine learning such as genetic programming and reinforcement learning using data that has been acquired in the past, it is possible to control base station parameters more adequately. For example, it becomes possible to predict the future and configure parameters when the number of users in the cell increases, thereby coping with dynamic changes more adequately.

Now, the radio base station according to the present embodiment will be described in detail below.

The radio base station first acquires surrounding environment information, as primary data, by scanning the surroundings. The primary data can be acquired by using raw data representing the surrounding environment, acquired by cameras, laser range scan sensors (laser scan sensors), radio beams (radar), thermographs and so on. Now, the acquisition of primary data will be described below separately.

Figure 8:
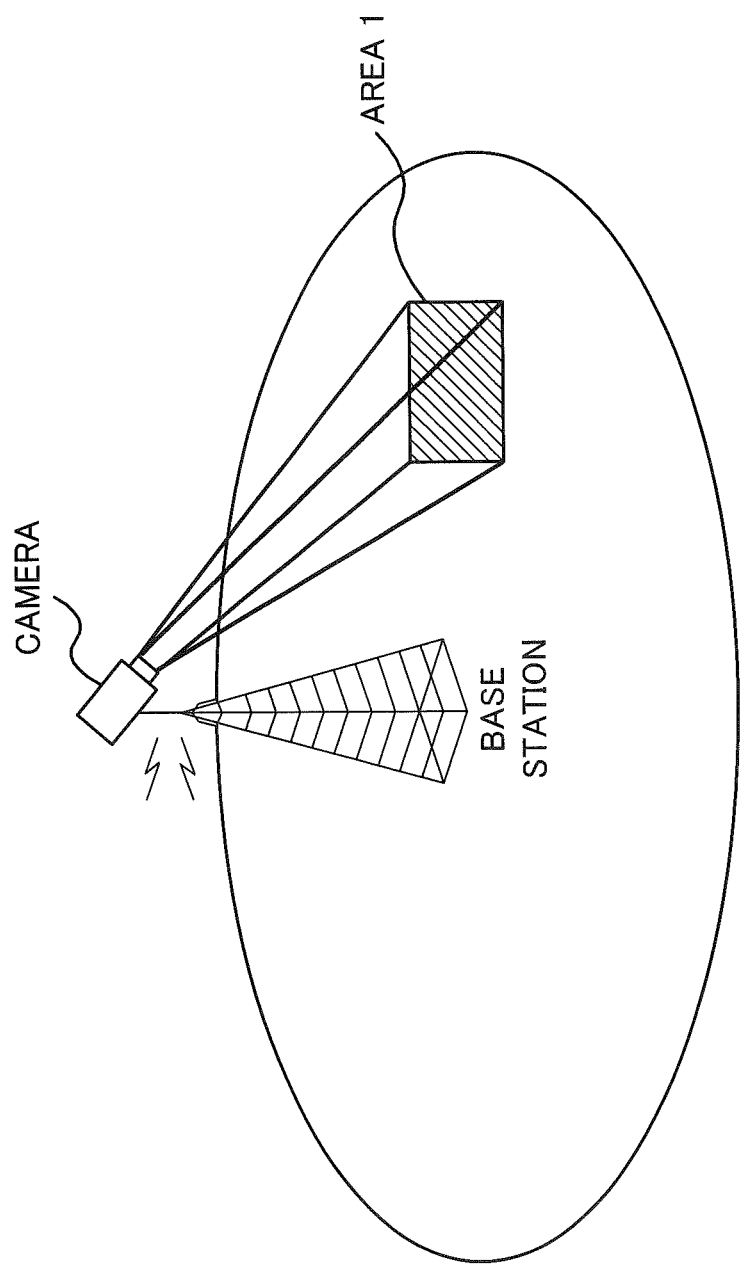
FIG. 8 shows an example in which a radio base station according to the present embodiment acquires primary data with a camera.

Primary data can be acquired by using cameras. To be more specific, still images and/or moving images that are taken by cameras that are mounted can be acquired as primary data. FIG. 8 show san example of acquiring primary data with a camera. In the case of FIG. 8, an image of area 1, which is in a downward direction from the location of the camera, is taken and acquired. When using a camera, the distance with respect to an object is estimated when generating secondary data, or is acquired by using other primary data. Note that the camera is preferably structured so that, when there is no shielding object, the camera can photograph from right below the radio base station to the edge areas of the radio base station's service area. To be more specific, the camera is preferably structured so that the location, height, the angle of azimuth, the angles of elevation and depression and so on are variable. Also, it is even more preferable if the camera is structured so that the zoom magnification of the camera, the resolution of still images and moving images, the frame rate of moving images and so on are variable. Also, the type of the camera is not limited to a general-purpose camera for photographing visible light, and a night vision camera, an X-ray camera, an ultrasonic camera and so on may be used as well. Also, it is also possible to mount a plurality of cameras in the radio base station.

Also, primary data can be acquired by using radar. To be more specific, when the radio base station has a plurality of antenna elements as shown in FIG. 3, the radio base station transmits radio beams by using predetermined antenna elements among these plurality of antenna elements, and receives the reflected waves of the beams by using at least one of the antenna elements other than the predetermined antenna elements. By this means, it is possible to measure the distance and direction with respect to the target object.

Figure 9:
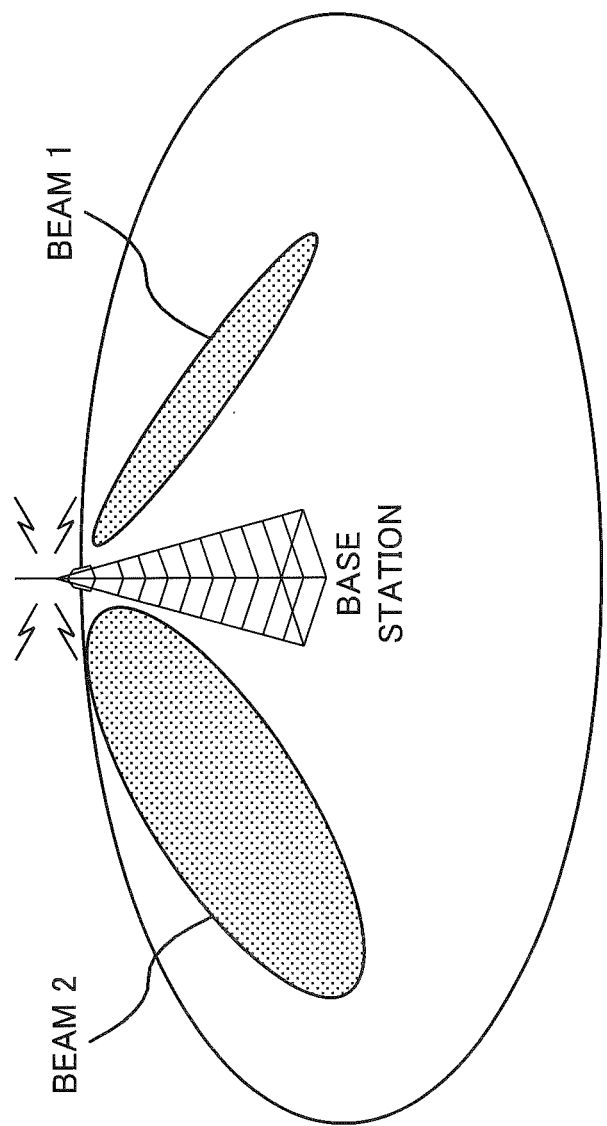
FIG. 9 shows an example in which a radio base station according to the present embodiment acquires primary data with radio beams.

FIG. 9 shows an example of acquiring primary data using radio beams. The beams are preferably provided in variable shapes, and, as shown in FIG. 9, it is also possible to use a beam of a narrow width (beam 1) to acquire data from a comparatively narrow range, and or use a beam of a wide width (beam 2) to acquire data over a comparatively wide range. The distance with respect to an object can be measured by the TOF (Time Of Flight) scheme, which measures the distance to the photographing object on the basis of the time it takes an electric wave transmitted to the object to be reflected upon the object and reach the sensor. Note that radar can be implemented with antenna elements which the radio base station uses in radio communication, so that no other device is required. However, besides the above antenna elements, it is also possible to provide a device for radar and use this in measurements.

Also, primary data can be measured by using a laser range scan sensor. A laser range scan sensor is a sensor which can measure distance using light. A laser range scan sensor can measure distance by the TOF scheme on the basis of the flight time of light and so on.

Also, primary data can be acquired by using a thermograph. A thermograph refers to an instrument which can analyze the infrared rays emitted from an object. Although it is difficult to acquire primary data by using a general-purpose cameras for photographing visible light during the night or when the radio base station is placed in a room where there is no source of light, a thermograph can be used even when there is no source of light.

The way to acquire primary data is by no means limited to the methods described above, and it is equally possible to use other sensors and so on. For example, it is possible to use audio data that is acquired by recording audio of the surroundings, ambient sounds, ultrasounds and so on with microphones, as primary data.

As described above, as for the acquisition of primary data, it is possible to use a plurality of means, in a complementary manner, to improve the reliability of the acquisition of information. Also, data that is acquired from sensors and so on outside the radio base station may be used as primary data. For example, it is possible to use still images and moving images that are taken by cameras outside the radio base station, or use picture data that is acquired via radio communication from satellites.

Table 1 shows examples of the primary data to be stored in the primary database. Table 1 shows the time data is acquired, the location of acquisition, the height, the angle of azimuth, the angles of elevation and depression, and the picture file name. For example, image data that corresponds to the area 1 in FIG. 8 stored as "G1_201309011200301.jpg" in the first row of table 1. Also, "HEIGHT" shown in table 1 is the height at which the camera is installed. Also, "ELEVATION/DEPRESSION ANGLE" shown in table 1 is the angle in the upward/downward direction with respect to the horizontal direction, where straight above is 90° (−90°) and straight below is −90° (90°). Note that the primary database is not limited to the above information, and may contain other information as well.

TABLE 1

| TIME OF ACQUISITION | LOCATION OF ACQUISITION | HEIGHT | AZIMUTH ANGLE | ELEVATION/ DEPRESSION ANGLE | PICTURE FILE NAME |
|---|---|---|---|---|---|
| 2013/9/1 12:00:30 | □ X1□ Y1□ | 10 m | SSW 10° | 11° | G1_201309011200301.jpg |
| 2013/9/1 12:00:35 | □ X1□ Y1□ | 10 m | SSW 20° | 11° | G1_201309011200351.jpg |

Next, as secondary data, the radio base station generates propagation environment information, which is information about electric wave propagation, by using the primary data. For the propagation environment information, it is preferable to include at least information about the relative locations with respect to objects seen from the radio base station.

When the primary data is a still image and/or a moving image, secondary data is generated by extracting an object by way of image recognition. As for the method of image recognition, for example, clustering, edge extraction, object extraction between moving image frames and so on may be used. By this means, the size of the object is derived. Also, when there is an image that is photographed from a different point of view, it is possible to estimate the distance between the camera and the object.

Also, when the primary data is acquired by using radar or a laser range scan sensor, a predetermined area where the estimated time of flight of electric waves or light is nearly equal is recognized as an object, and the location and size of the object are determined. The distance is already measured as the primary data and therefore needs not be calculated anew. Note that measurements by means of radar can give the reflection coefficients of the electric waves for actual use in radio communication, and therefore are effective to determine adequate base station parameters.

Table 2 shows examples of the secondary data to be stored in a secondary database. Table 2 shows the time data is acquired, the distance to the object, the height of the object, the width, the angle of azimuth, the speed and the reflection coefficient. Note that the secondary database is not limited to the above information, and may contain other information as well.

TABLE 2

| TIME OF ACQUISITION | DISTANCE | HEIGHT | WIDTH | AZIMUTH ANGLE | SPEED | REFLECTION COEFFICIENT |
|---|---|---|---|---|---|---|
| 2013/9/1 12:00:30 | 43 m | 10 m | 20 m | SSW 12.5° | 0 km/h | −10 dB |
| 2013/9/1 12:10:50 | 10 m | 2 m | 3 m | ESE 21.3° | 30 km/h | −2 dB |

Next, as tertiary data, the radio base station generates base station parameters, which are information about the control of electric waves to transmit and receive, by using the secondary data. With the present embodiment, tertiary data is generated by using the propagation path estimation technique. For example, the ray tracing method can be used. The ray tracing method is the technique of deriving the propagation paths of electric waves from the transmitting point to the receiving point on the basis of geometrical optics, taking into account the reflection, penetration and diffraction.

Figure 10:
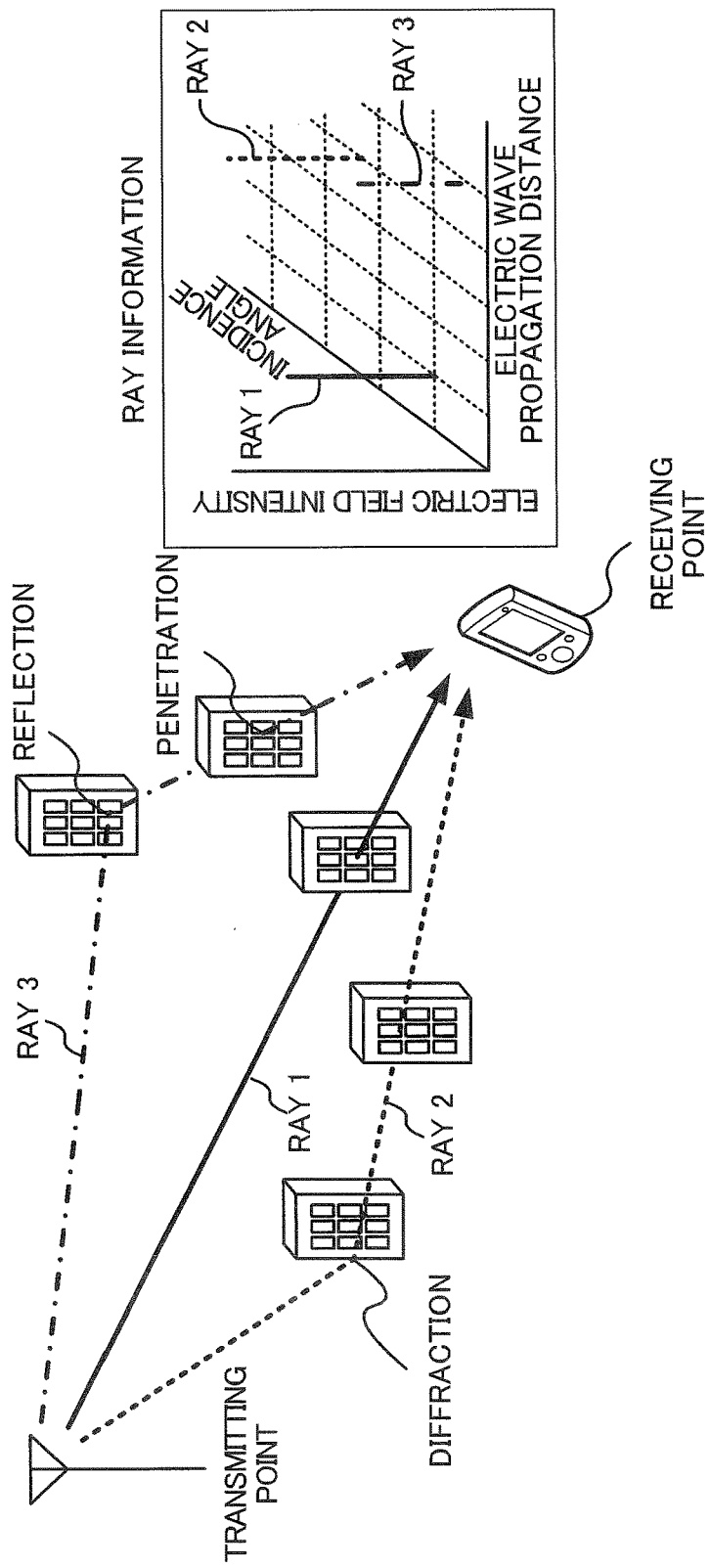
FIG. 10 is a diagram to explain the ray tracing method.

FIG. 10 is a diagram to explain the ray tracing method. In FIG. 10, among the paths where electric waves transmitted from the transmitting point may travel, three paths (rays 1 to 3) having reached the receiving point are shown. By means of a simulation based on the ray tracing method, it is possible to calculate, for each ray, the electric wave propagation distance to the receiving point, the incidence angle at the receiving point, the electric field intensity at the receiving point and so on. In this way, from the secondary data that is held, base station parameters to improve the received quality of electric waves in a predetermined location are determined. Here, for the received quality, the CQI (Channel Quality Indicator), the received SINR (Signal to Interference plus Noise Ratio), the RSRP (Reference Signal Received Power), the RSRQ (Reference Signal Received Quality) and so on may be used. Also, the received quality may be an instantaneous value, or may be a long-term average value. Also, the base station parameters may be determined so that the received quality in each location within the cell improves on average, or a predetermined area to improve the received quality preferentially may be determined within the cell.

With the present embodiment, a tertiary database is formed with a plurality of databases. For example, the tertiary database may be formed with a database for semi-static objects (referred to as the "semi-static DB") and a database for dynamic objects (referred to as the "dynamic DB"). In which database tertiary data is to be stored may be decided from the information about speed in the secondary data that is acquired.

The semi-static DB stores base station parameters for objects that, seen from the radio base station, are in fixed locations or that move at such low speeds that the objects can be seen not in motion. Semi-static objects include structures such as houses and buildings. With semi-static objects, the propagation path of electric waves is likely to change little over time, so that it is possible to secure an interval of sufficient length to acquire each data. Also, directions where semi-static objects are the majority need not be observed so closely, and therefore it is possible to photograph images in these directions in low resolution, widen the width of transmission beams in these directions, and so on. By this means, it is possible to reduce the load of the radio base station, without lowering the reliability of propagation environment estimation with respect to semi-static objects.

The dynamic DB stores base station parameters for objects that change their locations in comparatively high speeds, seen from the radio base station. Dynamic objects include vehicles, for example. With dynamic objects, the propagation path of electric waves is likely to change significantly over time, so that it is preferable to make the interval to acquire each data short. Also, in directions where there are dynamic objects, it is preferable to acquire primary data from high-resolution images and narrow the width of transmission beams in these directions. By this means, it is possible to improve the reliability of propagation environment estimation with respect to dynamic objects.

Tables 3 and 4 show an example of a semi-static DB and an example of a dynamic DB, respectively. In the examples of tables 3 and 4, the beam width of the tertiary data that is stored in the semi-static DB (table 3) is wider than the beam width of the tertiary data that is stored in the dynamic DB (table 4).

TABLE 3

| TIME OF ACQUISITION | AZIMUTH ANGLE | ELEVATION/ DEPRESSION ANGLE | BEAM WIDTH | NUMBER OF BEAMS | TRANSMITTING WEIGHT |
|---|---|---|---|---|---|
| 2013/9/1 12:00:30 | SSW 10° | 41.5° | 20° | 1 | $W_{1,1}$ |
| 2013/9/1 12:10:50 | SSW 20° | 41.5° | 20° | 1 | $W_{1,2}$ |

TABLE 4

| TIME OF ACQUISITION | AZIMUTH ANGLE | ELEVATION/ DEPRESSION ANGLE | BEAM WIDTH | NUMBER OF BEAMS | TRANSMITTING WEIGHT |
|---|---|---|---|---|---|
| 2013/9/1 12:00:30 | SSW 10° | 41.5° | 5° | 1 | $W_{2,1}$ |
| 2013/9/1 12:10:50 | SSW 12.5° | 41.5° | 5° | 1 | $W_{2,2}$ |

Figure 11:
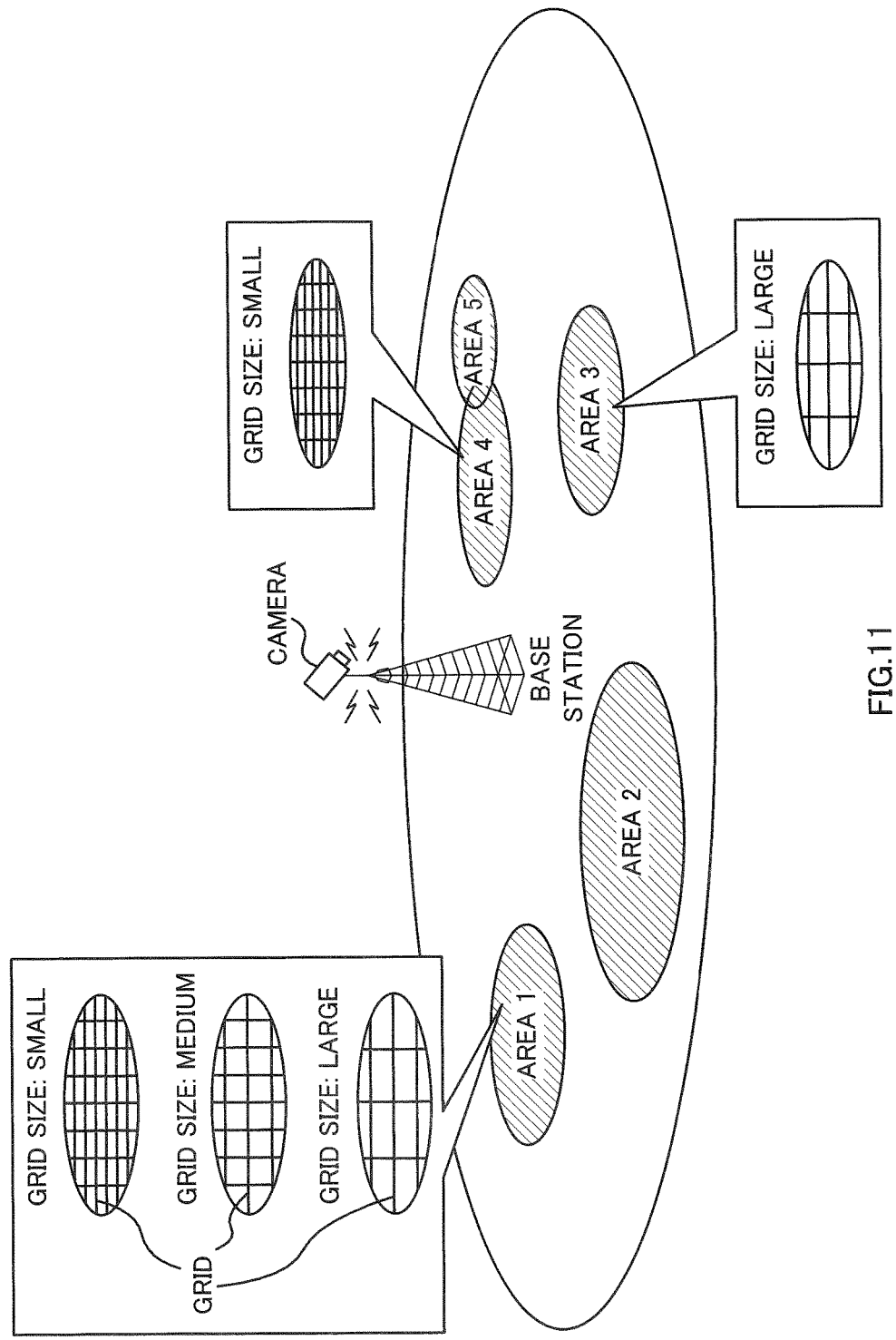
FIG. 11 is a diagram to explain a structure of tertiary data according to the present embodiment.

FIG. 11 is a diagram to explain the structure of tertiary data according to the present embodiment. The radio base station can configure a plurality of areas in varying grid sizes (resolutions) and determine base station parameters. Note that a grid size refers to the size of the geographic range where the same base station parameters are applied, and may be made the target range for acquiring primary data one time. For example, when the grid size is small, the camera's zoom magnification is increased and images of small ranges are photographed. Note that when there are a plurality of means for acquiring primary data such as cameras and radar, each may be configured with a separate grid size.

In FIG. 11, there are many semi-static objects in area 3, so that the grid size is large and the semi-static DB is employed. There are many dynamic objects in area 4, so that the grid size is small and the dynamic DB is employed. In area 1, there are both semi-static objects and dynamic objects, so that the semi-static DB is employed for a large grid size, an intermediate DB, which is between semi-static and dynamic, is employed for an intermediate grid size, and the dynamic DB is employed for a small grid size. In an area where a plurality of DBs are employed as in area 1, it is possible to determine base station parameters using a plurality of DBs in a complementary fashion. For example, the transmitting weight for a predetermined location can be calculated by complementing the weights for that location from a plurality of DBs. Note that the variations of grid size and DBs are by no means limited to the above combinations.

Note that the structure of the tertiary database is not limited to that described above. For example, it is possible to use the semi-static DB alone. Also, it is equally possible to use the semi-static DB alone by default, and use the dynamic DB in a complementary fashion only in periods in which a dynamic object is detected. Also, the storage location of the tertiary data of an object may be changed from the semi-static DB to the dynamic DB, or from the dynamic DB to the semi-static DB, when the data is updated. For example, when a vehicle, which is parked and information of which is stored in the semi-static DB, starts moving, it is possible to change the storage location of the tertiary data from the semi-static DB to the dynamic DB.

As described above, the radio base station according to the present embodiment, by acquiring surrounding environment information, which is information about the environment in the service area, can adequately extract propagation environment information, which is information about electric wave propagation, and adequately determine base station parameters, which are information about the control of electric waves to transmit and receive.

<Variation>

With the present embodiment, it is equally possible to coordinate the control of base station parameters between a plurality of radio base stations. For example, referring to FIG. 11, when an unillustrated neighboring small base station (SeNB) includes part of area 1 in its service area, by sharing the database information which each SeNB holds in relationship to the shared part of area 1, it is possible to improve the reliability of propagation environment estimation with respect to this shared part. Also, the radio base station may be structured to receive at least one of surrounding environment information, propagation environment information and base station parameters from other radio base stations, and acquire at least one of surrounding environment information, propagation environment information and base station parameter on the basis of the acquired information.

Also, although, in the above-described example, the radio base station has determined base station parameters separately so that the received quality improves in each service area, the radio base station may also be structured to determine a plurality of base station parameters in a comprehensive fashion, by taking into account multiple cells. For example, it is possible to control base station parameters by allowing a higher base station, to which each radio base station is connected via cable or via radio, to gather and manage database information, and supply control information to the radio base stations. Also, instead of each radio base station, the higher base station may acquire and generate the data of the order n, and store this data in a database.

Also, by gather and using database information, it becomes possible to make adequate base station parameter databases that are suitable for each environment, on the basis of data that is collected in various radio base stations. By this means, even when a dynamic change which a radio base station has never experienced in the past occurs in the surrounding environment, the radio base station can realize adequate communication based on data that is acquired in other radio base stations.

Also, when there is information to feed back from a user terminal to a radio base station, it is possible to improve the reliability of propagation environment estimation by using this information. For example, the user terminal may use information about geographic locations that is acquired from GPS (Global Positioning System), gyro sensors, compasses and so on, and image information that is acquired from cameras and so on, as feedback information. Also, it is also possible to improve the reliability of propagation environment estimation by using information about the deployment of radio base stations.

Also, it is possible to correct and update data in a DB where the interval for acquiring data is comparatively long like the semi-static DB, by using data in a DB where the interval for acquiring data is comparatively short like the dynamic DB. For example, by using the time-average value of dynamic DB data pertaining to a predetermined location, it is possible to correct semi-static DB data pertaining to the same location.

(Structure of Radio Communication System)

Figure 12:
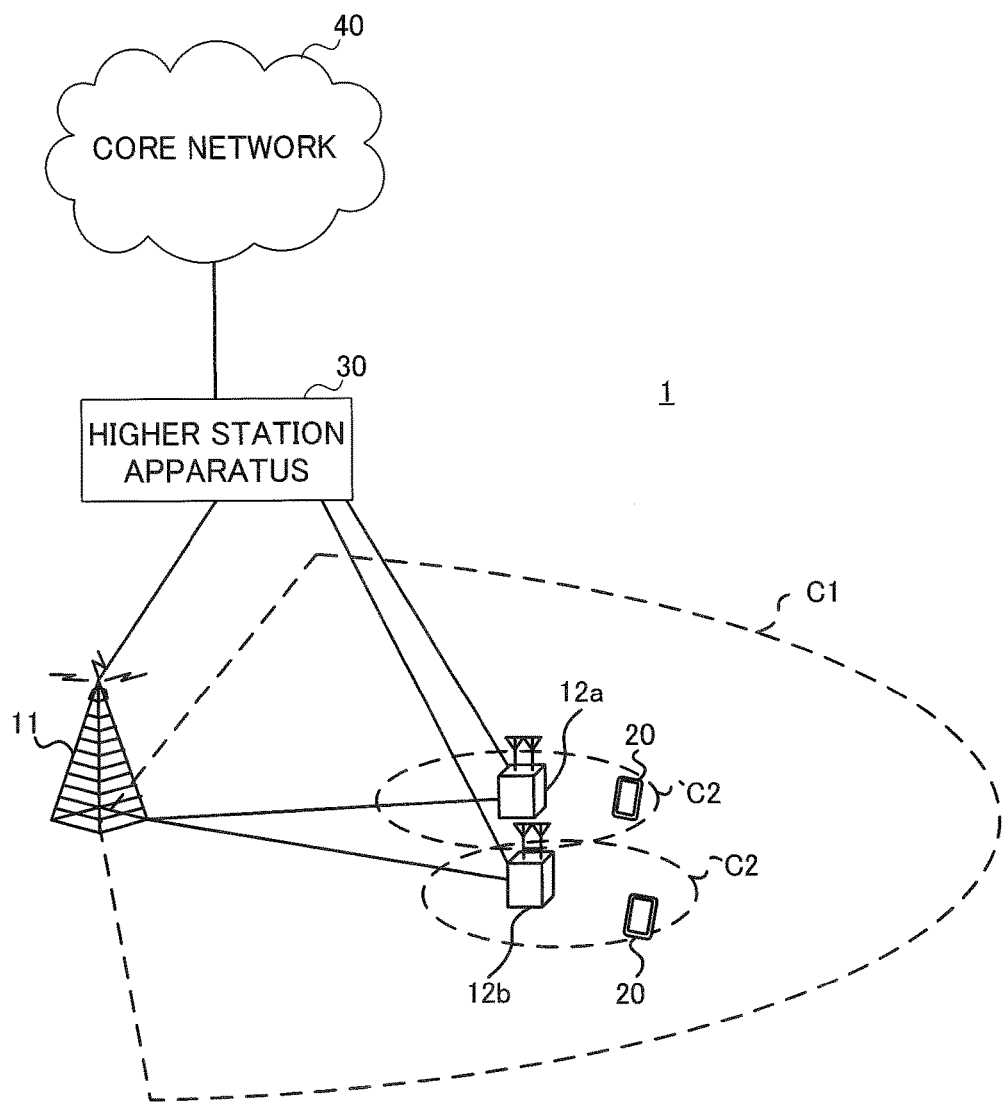
FIG. 12 is a schematic diagram to show an example of a radio communication system according to the present embodiment.

Now, the structure of the radio communication system according to the present embodiment will be described with reference to FIGS. 12 to 14. FIG. 12 is a schematic configuration diagram of the radio communication system according to the present embodiment. As shown in FIG. 12, the radio communication system 1 includes a macro base station 11, which forms a macro cell C1, and small base stations 12a and 12b, which are placed in the macro cell C1 and which form small cells C2 that are narrower than the macro cell C1. Also, user terminals 20 are placed in the macro cell C1 and each small cell C2. The user terminals 20 are configured to be able to perform radio communication with both of the macro station 11 and the small base stations 12. According to the present embodiment, a radio base station may be either a macro base station 11 to form a macro cell C1, or may be small base station 12a and 12b to form small cell C2, which is narrower than the macro cell C1.

The macro base station 11 and each small base station 12 may be connected via cable or may be connected via radio. The macro base station 11 and the small base stations 12 are each connected to a higher station apparatus 30, and are connected to a core network 40 via the higher station apparatus 30. Note that the higher station apparatus 30 may be, for example, an access gateway apparatus, a radio network controller (RNC), a mobility management entity (MME) and so on, but is by no means limited to these.

Note that the macro base station 11 is a radio base station having a relatively wide coverage, and may be referred to as an "eNodeB (eNB)," a "radio base station," a "transmission point" and so on. The small base stations 12 are radio base stations that have local coverages, and may be referred to as "RRHs (Remote Radio Heads)," "pico base stations," "femto base stations," "home eNodeBs," "transmission points," "eNodeBs (eNBs)" and so on. The user terminals 20 are terminals to support various communication schemes such as LTE and LTE-A, and may not only be mobile communication terminals, but may also be stationary communication terminals as well. Note that the structure of the radio communication system according to the present embodiment is by no means limited to the structure shown in FIG. 12. For example, the present embodiment is also applicable to small base stations 12 that do not overlap the macro base station 11.

The macro base station 11 and the small base stations 12 will be hereinafter collectively referred to as "radio base station 10," unless distinction is drawn otherwise. A radio base station 10 according to the present embodiment has functions that a normal radio base station has. For example, the radio base station 10 has a transmitting/receiving antenna, an amplifying section, a transmitting/receiving section, a baseband signal processing section, a call processing section, a transmission path interface and so on. Note that the transmitting/receiving antenna may be formed with a plurality of antennas, or may be formed with antenna elements for massive MIMO.

Figure 13:
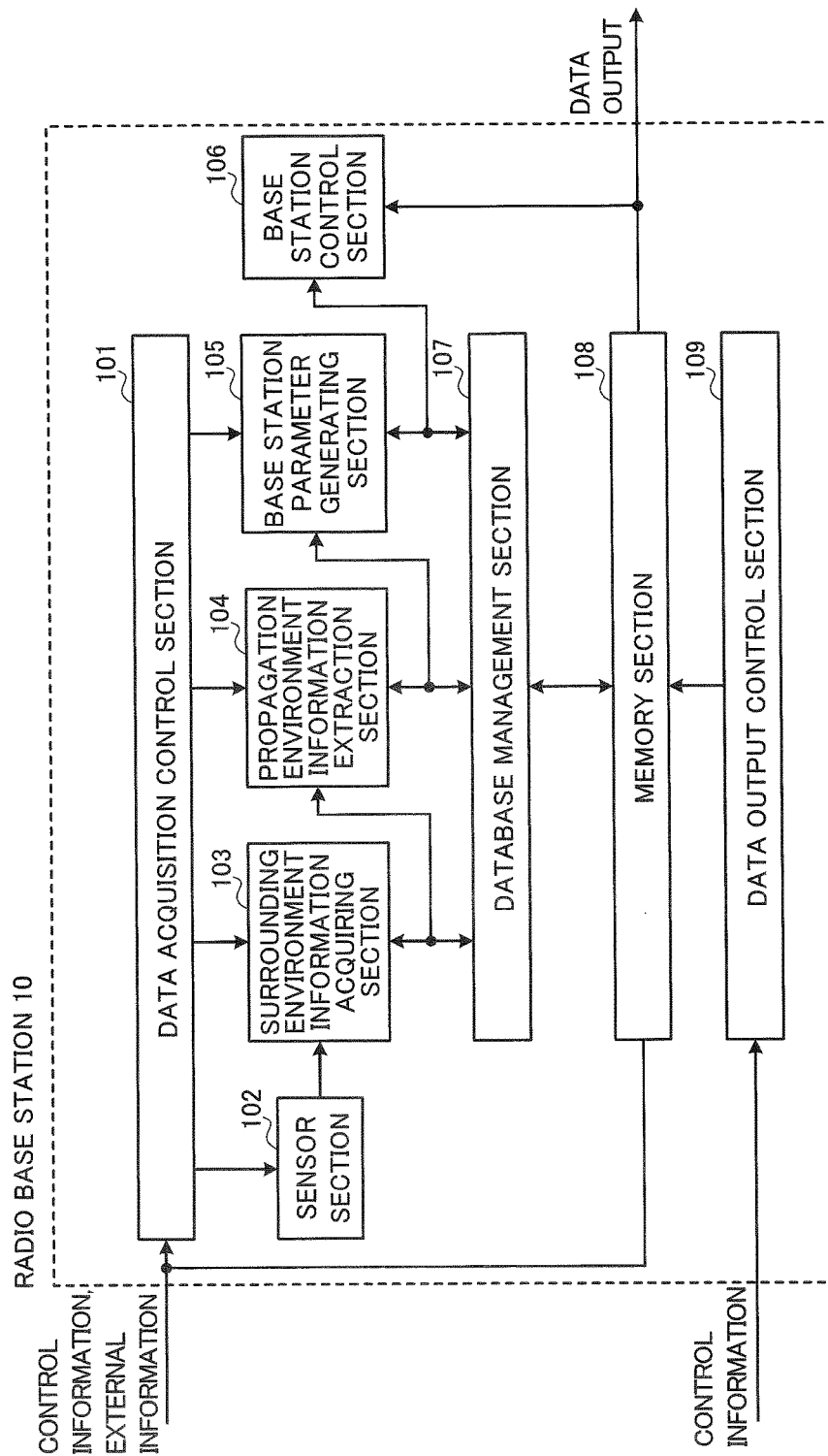
FIG. 13 is a diagram to explain a functional structure of a radio base station according to the present embodiment.
Figure 14:
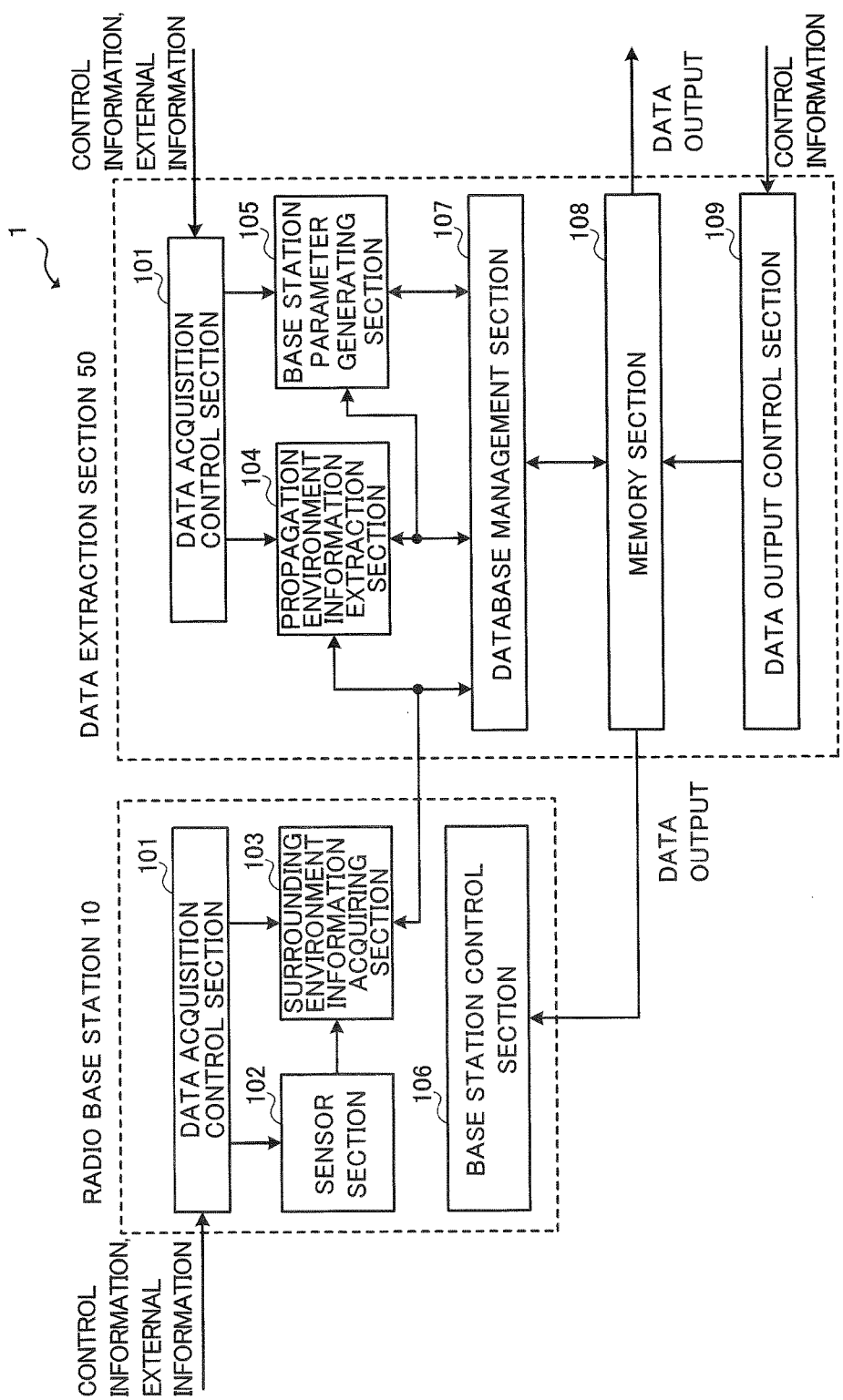
FIG. 14 is a diagram to explain a functional structure of a radio communication system according to the present embodiment.

FIG. 13 is a diagram to show a functional structure of the radio base station 10 according to the present embodiment. As shown in FIG. 13, the radio base station 10 has a data acquisition control section 101, a sensor section 102, a surrounding environment information acquiring section 103, a propagation environment information extraction section 104, a base station parameter generating section 105, a base station control section 106, a database management section 107, a memory section 108 and a data output control section 109.

The data acquisition control section 101 commands the sensor section 102, the surrounding environment information acquiring section 103, the propagation environment information extraction section 104 and the base station parameter generating section 105 to acquire data. As for the timing to command, the updating time interval may be configured on a per database basis, or the timing may be controlled on the basis of control information or information from outside.

The sensor section 102 acquires raw data for generating primary data, in accordance with commands from the data acquisition control section 101. As described above, for the sensor section 102 to acquire primary data, it is possible to use a camera, a laser range scan sensor (laser scan sensor), a radio beam (radar), a thermograph and so on. The raw data that is acquired is output to the surrounding environment information acquiring section 103.

The surrounding environment information acquiring section 103 acquires surrounding environment information pertaining to the environment in the service area from the raw data that is input from the sensor section 102 and that pertains to the environment in the service area, and outputs this information to the propagation environment information extraction section 104 and the database management section 107. As described earlier, upon acquiring the primary data, it may be possible to improve the reliability of the acquisition of information by using a plurality of means in a complementary fashion.

The propagation environment information extraction section 104 extracts propagation environment information, which is information about electric wave propagation from the primary data that is input from the surrounding environment information acquiring section 103, and outputs this information to the base station parameter generating section 105 and the database management section 107.

From the secondary data that is input from the propagation environment information extraction section 104, the base station parameter generating section 105 generates base station parameters, which are information about the control of electric waves to transmit and receive, and outputs these parameters to the base station control section 106 and the database management section 107. As described above, upon generation of tertiary data, base station parameters to improve the received quality of electric waves in predetermined locations as much as possible are determined, by using the secondary data and the propagation path estimation technique. As noted earlier, the received quality may be the CQI, the SINR, the RSRP, the RSRQ and so on.

The base station control section 106 employs the base station parameters input from the base station parameter generating section 105. Also, when base station parameters are input from the memory section 108, these parameters may be employed.

The database management section 107 stores the data input from the surrounding environment information acquiring section 103, the propagation environment information extraction section 104 and the base station parameter generating section 105 in the database to correspond to the memory section 108. Note that, instead of adding input data to the database on an as-is basis, it is possible to correct and remove the data held in the memory section 108. Also, it is equally possible to add, remove and integrate databases themselves. Also, if information that is the same as or similar to the data that is input is already in the database, the database management section 107 may command the memory section 108 to output base station parameters to the base station control section 106 for re-use of data. Also, the database management section 107 may be structured to extract data from the memory section 108 and output various information to the surrounding environment information acquiring section 103, the propagation environment information extraction section 104 or the base station parameter generating section 105, and each section may be structured to acquire, extract and generate information from the input data.

The memory section 108 stores the data input from the database management section 107 in the database. Also, other information such as information about the deployment of radio base stations 10 and so on may be stored as well. Also, it is equally possible to store information that is input from outside such as information about other radio base stations, or it is possible to correct data on the basis of information from outside. Furthermore, when the memory section 108 is commanded from the database management section 107 to output surrounding environment information, propagation environment information or base station parameters, the memory section 108 can output various information to the surrounding environment information acquiring section 103, the propagation environment information extraction section 104 or the base station parameter generating section 105. Furthermore, when the memory section 108 is commanded to output data from the data output control section 109, the memory section 108 can output predetermined data to outside or to the base station control section 106.

The data output control section 109 commands the memory section 108 to output data on the basis of the control information that is input.

As described above, with the radio communication system 1 according to the present embodiment, the radio base station 10 acquires surrounding environment information, which is information about the environment in the service area, extracts propagation environment information, which is information about electric wave propagation, on the basis of the surrounding environment information, and, on the basis of the propagation environment information, generates base station parameters, which are control information about the control of electric waves to transmit and receive. Consequently, a radio base station can control base station parameters adequately in accordance with changes in the surrounding propagation environment.

(Example of Application)

Note that the radio communication system 1 according to the present embodiment is not limited to structures in which, as shown in FIG. 13, the radio base station 10 acquires each information. It is equally possible to employ a structure in which surrounding environment information is acquired in the radio base station 10, and the extraction of propagation environment information and the generation of parameters take place in other devices on the network. For example, as shown in FIG. 14, a structure may be employed in which the radio base station 10 has the data acquisition control section 101, the sensor section 102, the surrounding environment information acquiring section 103 and the base station control section 106, and in which a data extraction section 50, which is apart from the radio base station 10, has the data acquisition control section 101, the propagation environment information extraction section 104, the base station parameter generating section 105, the database management section 107, the memory section 108 and the data acquisition control section 109. Here, each section may be structured the same as in FIG. 13. Also, the data extraction section 50 may be provided in other devices than the radio base station 10, and may be provided, for example, in the higher base station 30 of FIG. 12, or in the core network 40.

Also, unlike conventional radio base stations, the radio base station according to the present embodiment can easily acquire surrounding environment information, propagation environment information and base station parameters. These pieces of information may be used in base stations, and, furthermore, output to the outside by giving control information for commanding the radio base station to output data. Consequently, the radio base station according to the present embodiment can be applied to following usage.

The radio base station according to the present embodiment may be used for HW (hardware) failure detection and calibration. For example, the radio base station according to the present embodiment may be used for HW failure detection in the BB (baseband) circuit, the RF (Radio Frequency) circuit, the antenna and so on, provided in the radio base station. To be more specific, HW failure is detected on the basis of the difference between the propagation path estimated on the basis of data that is stored in the database and the actual propagation path, whether not changes are normal, and so on. Also, on the basis of the above difference and so on, it is possible to correct HW configuration parameters, and carry out calibration automatically.

Also, the radio base station according to the present embodiment may be used to update base station information automatically. For example, base stations that are deployed anew in the surroundings are detected and information thereof is collected in a higher node (higher base station), and base station information is automatically updated. This automatic updating can be applied upon building SON (Self-Organizing Network).

Also, the radio base station according to the present embodiment may be used to detect mobile entities. For example, by detecting changes with the data stored in the dynamic DB where the updating interval is short, it is possible to detect trespassers/intruders having entered the vicinity of the radio base station. Also, this detection information, images photographed by cameras mounted on the radio base station and so on can be communicated from the radio base station itself, and therefore can be easily forwarded to external terminals and external databases, and can be used in surveillance systems. Furthermore, by utilizing this, the radio base station according to the present embodiment can supply information for monitoring services for checking on the safety of children and the elderly from a remote site.

Also, the radio base station according to the present embodiment may be used to heighten the level of mobile communication. For example, communication traffic to be produced in the future may be predicted by predicting the density of user terminals in cells and their likelihood in movement. Also, it is possible to learn the distribution of users, and, by cooperating with other radio base stations, control the distribution of load.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitation of claims. That is to say, the description herein is provided only for the purpose of explaining examples, and should by no means be construed to limit the present invention in any way.

The disclosure of Japanese Patent Application No. 2013-185081, filed on Sep. 6, 2013, including the specification, drawings and abstract, is incorporated herein by reference in its entirety.

The invention claimed is:

1. A radio base station comprising:
a transmitter that transmits a beam formed by using a given antenna element among a plurality of antenna elements;
a receiver that receives a reflected wave of the beam by using at least one antenna element that is different from or the same as the given antenna element among the plurality of antenna elements and surrounding environment information, which is information about environment in a service area; and
a processor that:
extracts propagation environment information, which is information about electric wave propagation, based on the reflected wave by using the surrounding environment information; and
generates base station parameters, which are information about control of electric waves to transmit and receive, based on the propagation environment information,
wherein the processor makes an interval for acquiring data with respect to an object that is fixed longer than the interval for acquiring data with respect to an object that is moving.

2. The radio base station according to claim 1, wherein the processor estimates a propagation path by using the propagation environment information, and generates base station parameters that are suitable for transmitting the electric waves.

3. The radio base station according to claim 1, wherein the processor:
acquires a still image and/or a moving image of the surrounding environment; and
extracts the propagation environment information of a surrounding object based on the still image and/or the moving image acquired.

4. The radio base station according to claim 1, further comprising a laser range scan sensor, wherein the processor:
executes laser scan with the laser range scan sensor; and
extracts the propagation environment information of a surrounding object based on a result of the laser scan.

5. The radio base station according to claim 1, further comprising a database that stores at least one of the surrounding environment information, the propagation environment information and the base station parameters,
wherein, when there is information in the database that is the same as or similar to information that is acquired, the propagation environment information and the base station parameters are acquired from the database based on the same or similar information, instead of extracting the propagation environment information and generating parameters based on the information that is acquired.

6. The radio base station according to claim 1, wherein the propagation environment information is acquired by using information about a geographic location or surrounding environment that is fed back from the user terminal.

7. A radio communication system comprising:
a first base station that comprises:
a transmitter that transmits a beam formed by using a given antenna element among a plurality of antenna elements; and
a receiver that receives a reflected wave of the beam by using at least one antenna element that is different from or the same as the given antenna element among the plurality of antenna elements and surrounding environment information, which is information about environment in a service area; and
a second base station that comprises:
a processor that:
extracts propagation environment information, which is information about electric wave propagation, based on the reflected wave by using the surrounding environment information received in the first base station; and
generates base station parameters, which are information about control of electric waves to transmit and receive, based on the propagation environment information,
wherein the processor makes an interval for acquiring data with respect to an object that is fixed longer than the interval for acquiring data with respect to an object that is moving.

8. A radio communication method for a radio base station and a user terminal, comprising:
transmitting a beam formed by using a given antenna element among a plurality of antenna elements;
receiving a reflected wave of the beam by using at least one antenna element that is different from or the same as the given antenna element among the plurality of antenna elements and surrounding environment information, which is information about environment in a service area;
extracting propagation environment information, which is information about electric wave propagation, based on the reflected wave by using the surrounding environment information; and
generating base station parameters, which are information about control of electric waves to transmit and receive, based on the propagation environment information,
wherein an interval for acquiring data with respect to an object that is fixed is made longer than the interval for acquiring data with respect to an object that is moving.

9. The radio base station according to claim 2, wherein the processor:
acquires a still image and/or a moving image of the surrounding environment; and
extracts the propagation environment information of a surrounding object based on the still image and/or the moving image acquired.

10. The radio base station according to claim 2, further comprising a laser range scan sensor, wherein the processor:
executes laser scan with the laser range scan sensor; and
extracts the propagation environment information of a surrounding object based on a result of the laser scan.

11. The radio base station according to claim 2, further comprising a database that stores at least one of the surrounding environment information, the propagation environment information and the base station parameters,
wherein, when there is information in the database that is the same as or similar to information that is acquired, the propagation environment information and the base station parameters are acquired from the database based on the same or similar information, instead of extracting the propagation environment information and generating parameters based on the information that is acquired.

12. The radio base station according to claim 2, wherein the propagation environment information is acquired by using information about a geographic location or surrounding environment that is fed back from the user terminal.

* * * * *